United States Patent [19]

Clossey

[11] Patent Number: 4,474,557

[45] Date of Patent: Oct. 2, 1984

[54] ELECTRONIC WORLD MAP GAME

[76] Inventor: Mary Clossey, 433 Oakdene Ave., Cliffside Park, N.J. 07010

[21] Appl. No.: 539,398

[22] Filed: Oct. 6, 1983

[51] Int. Cl.³ .............................................. G09B 29/00
[52] U.S. Cl. ..................................... 434/153; 434/335
[58] Field of Search ............... 434/150, 153, 335, 338, 434/339

[56] References Cited

U.S. PATENT DOCUMENTS

| | | | |
|---|---|---|---|
| 700,463 | 8/1902 | Smith | 434/150 |
| 1,932,909 | 10/1933 | Pollard et al. | 434/153 |
| 2,139,860 | 12/1938 | Schwendeman | 434/150 |
| 3,495,833 | 2/1970 | Wesley | 434/150 X |
| 3,711,966 | 1/1973 | Dresak | 434/150 X |
| 4,449,941 | 5/1984 | McGuire et al. | 434/153 |

FOREIGN PATENT DOCUMENTS

| | | | |
|---|---|---|---|
| 662133 | 4/1964 | Italy | 434/153 |
| 672439 | 10/1964 | Italy | 434/153 |
| 202529 | 8/1923 | United Kingdom | 434/153 |

Primary Examiner—William H. Grieb

[57] ABSTRACT

This world map game is a teaching aid for easing the learning process of school pupils who have difficulty in the recognition of land masses of the world map. Primarily, it consists of a board structure, having a map of the world on its face, which includes figures and objects that represent continent and countries, and bulbs of diodes are positioned in the masses and the question and answer read-out portion of the structure. The game further includes, a pair of pull-out slides for further instruction, when the game is being played.

4 Claims, 6 Drawing Figures

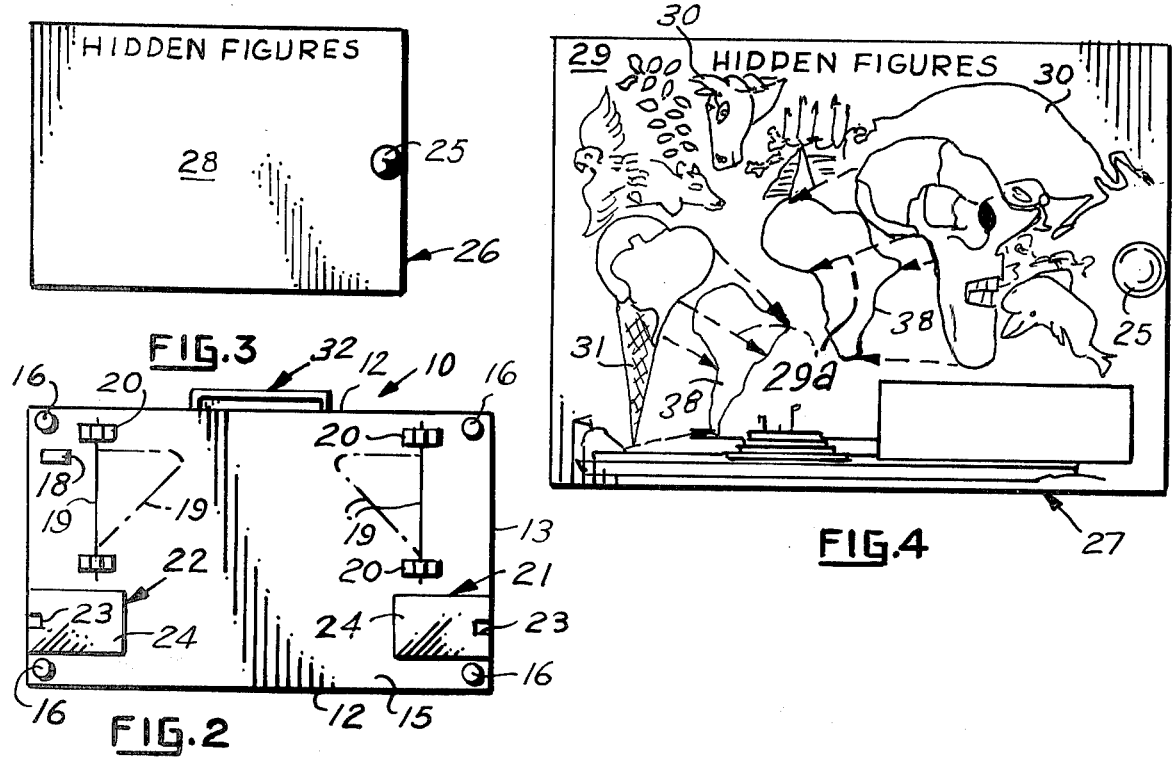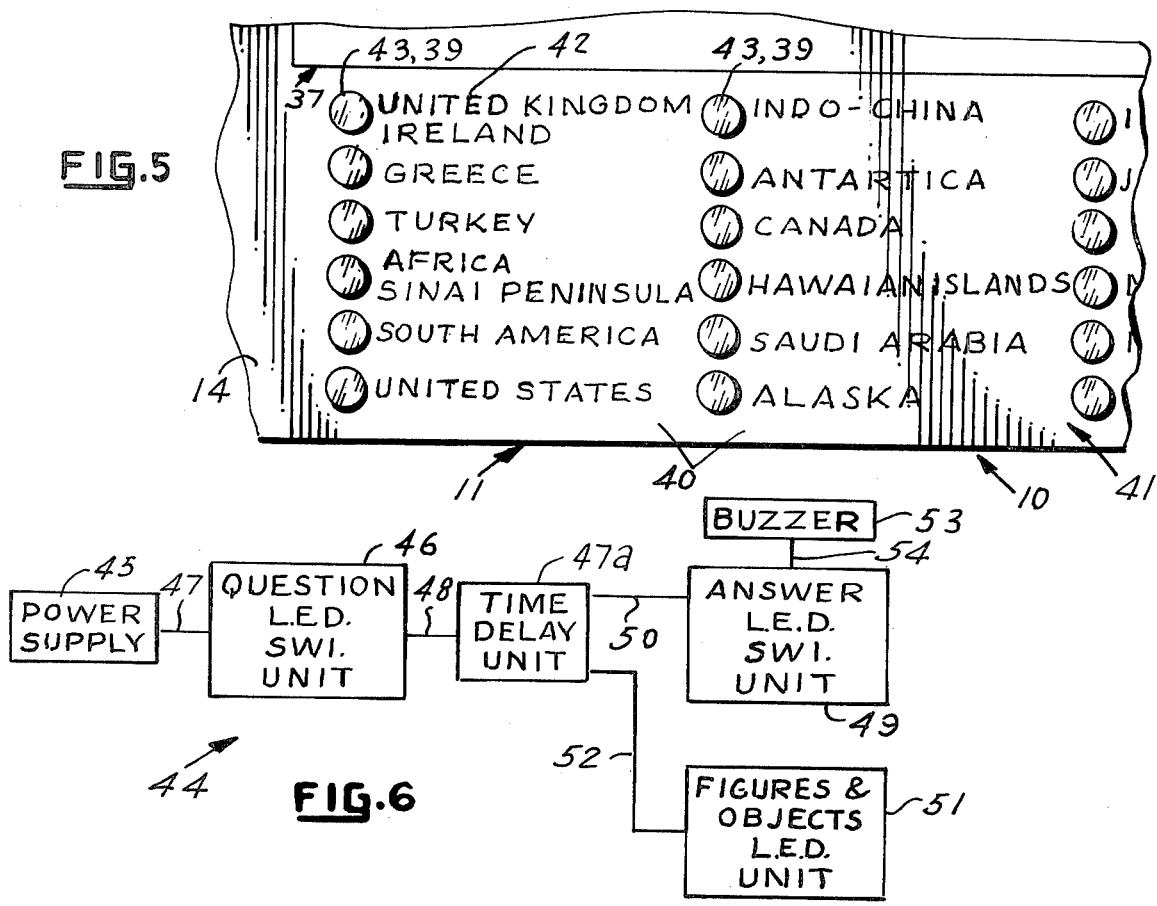

ELECTRONIC WORLD MAP GAME

This invention relates to teaching aids, and more particularly, to, an electronic world map game.

The principal object of this invention is to provide an electronic world map game, which will be employed to ease the learning process of school pupils who have difficulty in recognizing the land masses of the globe.

Another object of this invention is to provide an electronic world map game, which will be unique and novel, in that it will have as its primary purpose, the function of enabling pupils to recognize the land masses, through learning by association, the countries and continents of the world map.

Another object of this invention is to provide an electronic world map game, which will employ push-button and light emitting diode, or bulb means, to obtain correct answers, as to the recognition of countries, through the use of figures, such as an ice cream cone, which by its shape, will represent South America, and figures and objects will also be employed in the same above-mentioned manner, for the association with other continents and countries. A figure or group of figures of the invention, will represent a country, countries, or a continent. For example, the figure of a brontosaurus will represent the United States of America, in the same manner, as the ice cream cone represents the continent of South America, and the figure of a chandelier will represent Norway, Sweden, and Finland.

A further object of this invention is to provide an electronic world map game, which will also employ an attached pull-out slide on the right side of the game structure, for further instructions concerning the land masses, and another pull-out slide will be provided on the left side of the game structure, that will show the world map completely, in figures and objects.

A still further object of this invention is to provide an electronic world map game, which will be of such design, that it will motivate pupils to want to learn, by it being fascinating to play, and decorative in appearance.

An even further object of this invention is to provide an electronic world map game, which will employ time-delay means, that will give a period of five seconds for the pupil to discover if a correct answer has been given to a question, and if not, a buzzer will indicate a wrong answer, after which, the pupil may try again.

Other objects of the invention are to provide an electronic world map game, which will be simle in design, inexpensive to manufacture, rugged in construction, and easy to play.

These and other objects will become readily evident, upon a study of the specification, and the accompanying drawing, in which:

FIG. 2 is a bottom plan view of the invention, shown on a smaller scale, with the pair of slide members removed therefrom, and illustrating the folded condition of the legs, in phantom;

FIG. 3 is a top plan view of the right hand slide member, shown on a larger scale;

FIG. 4 is a top plan view of the left hand slide member, shown on a much larger scale;

FIG. 5 is a fragmentary and further enlarged top plan view of FIG. 1, and

FIG. 6 is a block diagram of the circuit of the invention.

Figure 1:
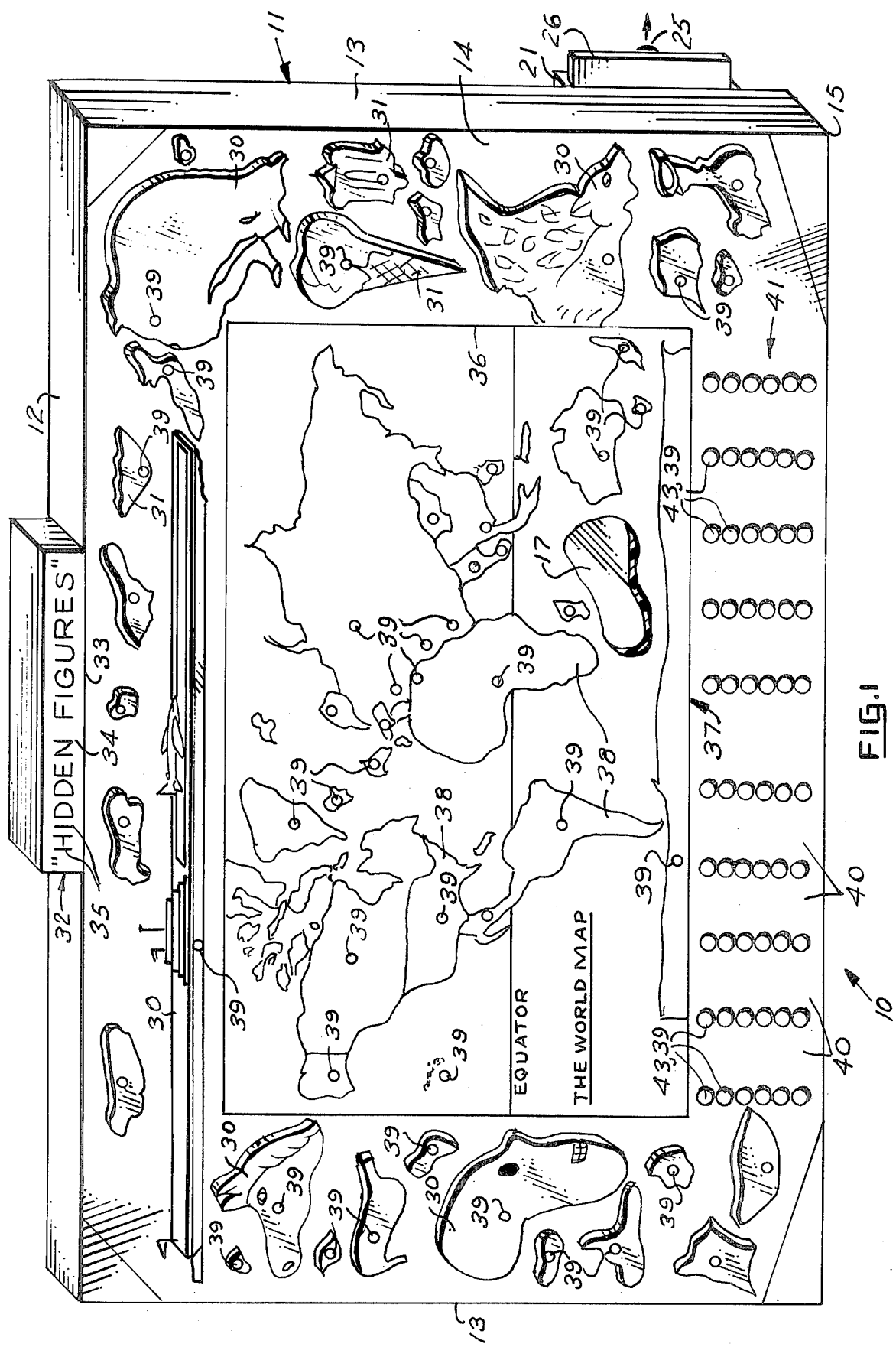
FIG. 1 is a perspective view of the present invention, shown partly in section, and illustrating one of the slide members partially extended therefrom.

Accordingly, a game 10 is shown to include a hollow rectangular board 11, having a pair of side walls 12, a pair of end walls 13, a top wall 14, and a bottom wall 15, which are secured together, in a manner, common in the art and not shown. A rubber or plastic foot 16 is fixedly secured at each corner in a suitable manner, to bottom wall 15, and a printed circuit board 17 is suitably secured on the interior of board 11, and contains a circuit, which is common in the art, for the operation of game 10. A battery box 18 is suitably secured to bottom wall 15, for housing a battery to operate game 10, and a pair of rod type legs 19, are hingeably secured by bracket 20 means, which are fixedly secured to bottom wall 15, in a manner, also not shown. A hollow rectangular housing 21 is fixedly secured in a suitable manner, to the right side bottom portion of bottom wall 15, and a similar housing 22 is suitably secured to the left side bottom portion of bottom wall 15, and each of the housings 21 and 22 includes an end cut-out opening 23, in its outside surface 24, which freely receives a knob 25, that is used to grasp the slide members 26 and 27, which are rectangular and flat in configuration. Slide member 26, has imprinted on its face 28, the key to how to recognize the countries of the world map, with figures, and the countries are listed by numerical characters, not shown in FIG. 3, but typical arrangement is as follows, but is not limited to such.

| | |
|---|---|
| 1. Alaska | The Flying Eagle |
| 2. Canada | The Blurred Tatoo |
| 3. United States | The Brontosaurus |
| 4. Mexico And Central Americas (Guatemala, El Salvador, Nicaragua, Costa Rica, Panama, British Honduras) | The Horn of Plenty (Cornucopia) |
| 5. South America | Double Scoop of Ice Cream on a Cone |
| 6. Islands In Carribean (Cuba, Jamaica,, Haiti, Dominican Republic, Puerto Rico, Antilles, Nassau) | Pumpkin Seeds |
| 7. Antarctica | The Aircraft Carrier |
| 8. Greenland | The Horse's Head |
| 9. Iceland | The Ink Spot |
| 10. Soviet Union | The Rushing Bull |
| 11. Norway, Sweden And Finland | The Chandelier |
| 12. United Kingdom (England, Wales, Scotland) | The Poodle |
| 13. Ireland (Northern Ireland and Ireland) | The Shamrock |
| 14. Europe (Spain, Portugal, France, Belgium, Netherlands, Luxembourg, West and East Germany, Denmark, Poland, Czechoslovakia, Rumania, Bulgaria, Yugoslavia, Hungary, Austria, Switzerland, Albania) | The Ascending and Descending Stairs |
| 15. Italy And Sicily | The Boot and Football |
| 16. Greece and Islands (Crete, Cyprus, Nicosia) | The Explosion |
| 17. Corsica And Sardinia | The Semi-colon |
| 18. Turkey | The Bridge |
| 19. Africa | The Skull |
| 20. Sinai Peninsula | The Flint Stone (Early Caveman Weapon) |
| 21. Saudi Arabia (Yemen, Oman, Kuwait) | Baby's Booty |
| 22. Near East Countries (Syria, Lebanon, Israel, Jordan, Iraq, Iran, Afghanistan, Pakistan, Kashmir) | Flannel Slipper |
| 23. India | Small Scoop of |

| -continued | |
|---|---|
| (Nepal, Bluta, Bangladesh) | Ice Cream on a Small Cone |
| 24. Sri-Lanka (Ceylon) | Tear Drop |
| 25. China and Tibet | The Jug |
| 26. North And South Korea | The Handle of the Jug (China) |
| 27. Mongolia | The Baby Seal |
| 28. Indo-China (Burma, Thailand, Cambodia, Laos, Vietnam) | The Parrot |
| 29. Japan And Islands | The Seal and Ball |
| 30. Australia | The Leaping Dolphin |
| 31. Tasmania | The Drop of Water |
| 32. New Zealand | The Broken Bone |
| 33. The Pacific Islands (Indonesia Islands, Taiwan, Okinawa, Philippines, New Guinea) | Bread Crumbs |
| 34. Malagasy | Wooden Shoes |
| 35. Hawaiian Islands | The Dots and Dashes |

Slide Member 27, has imprinted upon its face 29, the world map, which includes the figures 30 and objects 31, and it also includes dash line arrows 29a, which indicates the relationship of the figures and objects 30 and 31, as to their correct placement on the continents, which in this instance, are the ice cream cone as associated with South America, and the skull, as associated with Africa, and both slide members 26 and 27, are imprinted with the words, hidden figures.

It shall be noted, that slide members 26 and 27, serve as additional information devices for playing game 10.

A rectangular hollow member 32, is fixedly secured at its bottom edges 33, to the top side wall 12, in a suitable manner, not shown, and serves as a carrying handle and sign. Its front face 34, has the words, hidden figures, inscribed thereon, by the letter characters 35, and a rectangular border line 36, is inscribed on the top wall 14 of board 11. The world map 37 is inscribed within the confines of border line 36, and it shall also be noted, that board 11, housings 21 and 22, slide members 26 and 27, and member 32, are fabricated of plastic or other suitable material that is light in weight, so as to enable game 10 to be easily carried or transported from place to place. The world map 37 includes all of the continents 38, such as South America, Africa, Australia, etc. A light emitting diode or bulb 39 is visible within the confines of the outlines of the continents 38, and is mounted in an opening through board 11, not shown. Similar bulbs 39, are also mounted within the confines of the outlines of major countries, and in the outlines of figures 30 and objects 31, so as to light up when game 10 is played. A plurality of similar bulbs 39, are also provided, and mounted within openings, not shown, located within the spaces 40, which define the read-out section 41 on top wall 14 of game 10, the left half of which, is composed of questions, and the right half is composed of answers. The answers are all of the multiple-choice type, so as to enable the pupils to learn to recognize the land masses. The read-out section 41 is composed of a plurality of characters 42, adjacent to which the switches 43 are located, and the associated diodes or bulbs 39, are provided, so as to light up when the player pushes one of the switches 43, which is identified by the letter characters 42 naming a continent 38 or country. The multiple choice answer portion, also includes the same switch 43 and bulb 39 combinations, so as to enable the player to choose what he or she thinks is the correct answer to the question selected, and the circuit 44, which is prior art, includes the battery box 18 power supply 45, which is coupled to the question LED switch unit 46 by line 47, and unit 46 is also coupled to time delay unit 47a by line 48. The unit 47a is also coupled to answer LED switch unit 49 by line 50, and figures and objects LED unit 51 by line 52. The buzzer 53, is also coupled to the answer LED unit 49 by line 54, for delivering an audible alarm when an answer is incorrect.

In playing game 10, the player pushes one of the switches 43 for a question selection, which is on the left portion of the read-out section 41, which lights up its self-contained bulb 39. For example, the player presses the push-button switch 43 that reads South America. When this particular bulb 39 lights up, he then pushes one of the switches 43 on the answer portion of the read-out section 41, which he believes is the correct answer, that in this case, is an ice cream cone object 31. If he has chosen correctly, there will be a time delay of five seconds, caused by the time delay unit 47a of circuit 44, and diode or bulb 39 of the ice cream cone 31, will light, thus indicating that he chose the correct answer. In the event he chose the wrong amswer, then the buzzer 53 of circuit 44 on the interior of board 11, will deliver an audible sound, and the bulb of ice cream cone 31 will not light, because the ice cream cone 31, by its shape is the only shape that will correspond to the contoured shape of the continent of South America. For obtaining the correct answers for all of the continents and major countries, the same abovementioned procedure is followed.

While various changes may be made in the detail construction, such changes will be within the spirit and scope of the present invention, as defined by the appended claims.

I claim:

1. A world map game, comprising, a hollow board, a world map inscribed on said board, a pair of folding legs secured to said board, a plurality of figures and objects secured to said board, for representing continents and major countries, a pair of pull-out slide members received on said board, for further instruction when playing said world map game, a question and answer read-out section inscribed on said board, and a plurality of light emitting diodes or bulbs secured in said board, for identifying said continents, said major countries, and the questions and answers, and a circuit with push-buttons, and self-contained battery means, secured within said board.

2. The combination as set forth in claim 1, wherein some of said light emitting diodes or bulbs, are secured within openings included in the face of said board, and a similar opening is included within said figures and objects, and one of said light emitting diodes or bulbs, is secured within another opening included in said face of said board, within the confines of each of said continents and major countries, which lights up when a correct said answer is given to a selected said question, when one of said push-buttons is pushed, and a corresponding said light emitting diode or bulb, lights up also, which is secured within further openings included within said question and answer read-out section inscribed on said board, and if said answer is incorrect, a buzzer in said circuit emits audible sound.

3. The combination as set forth in claim 2, wherein a hollow rectangular container is fixedly secured, one to each side of the rear face of said board, in a suitable manner, and one of said pair of pull-out members is freely and slideably received within the hollow confines of one said container, and the other one of said pair of pull-out members is freely and slideably received in the other said container.

4. The combination as set forth in claim 3, wherein said one of said pair of pull-out members, is imprinted with letter characters identifying said continents and said major countries, and said other one of said pair of pull-out members is inscribed with said world map, which includes said figures and objects, and direction lines, which indicate where said figures and objects are placed.

* * * * *